United States Patent
Rickabus et al.

(10) Patent No.: US 6,431,585 B1
(45) Date of Patent: Aug. 13, 2002

(54) DUAL STAGE FASTENER

(75) Inventors: Ted R. Rickabus, Ortonville; Peter Schwartz, Clinton Township, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/679,755

(22) Filed: Oct. 5, 2000

(51) Int. Cl.[7] .................. B60R 21/20; B60R 21/16; A44B 1/32; A41F 1/00; F16B 19/00
(52) U.S. Cl. .................. 280/728.3; 280/728.1; 280/732; 280/743.2; 280/728.2; 280/730.2; 24/114.05; 24/458; 24/629; 411/508; 411/999
(58) Field of Search .................. 280/728.3, 732, 280/743.2, 728.2, 730.2, 749, 728.1; 24/114.4, 114.05, 470, 458, 16 PB, 663, 629, 297; 411/508, 509, 510, 913, 999

(56) References Cited

U.S. PATENT DOCUMENTS

| | | | |
|---|---|---|---|
| 4,635,325 A | | 1/1987 | Yagi |
| 4,644,614 A | | 2/1987 | Mizusawa |
| 4,828,209 A | * | 5/1989 | Niemi .................. 248/220.42 |
| 4,854,014 A | * | 8/1989 | Ueno .................. 24/16 PB |
| 4,895,389 A | | 1/1990 | Pack, Jr. |
| 4,920,618 A | * | 5/1990 | Iguchi .................. 24/297 |
| 5,096,221 A | | 3/1992 | Combs et al. |
| 5,113,553 A | * | 5/1992 | Hutchinson .................. 24/108 |
| 5,403,034 A | * | 4/1995 | Gans et al. .................. 280/732 |
| 5,458,365 A | * | 10/1995 | Rogers et al. .................. 280/728.3 |
| 5,460,401 A | * | 10/1995 | Gans et al. .................. 280/728.3 |
| 5,472,228 A | | 12/1995 | Bentley et al. |
| 5,474,324 A | * | 12/1995 | Bentley et al. .................. 280/728.3 |
| 5,496,060 A | * | 3/1996 | Whited et al. .................. 280/728.3 |
| 5,509,182 A | * | 4/1996 | Nakanishi .................. 24/289 |
| 5,590,900 A | * | 1/1997 | Duran et al. .................. 280/728.2 |
| 5,613,701 A | * | 3/1997 | Bentley et al. .................. 280/728.3 |
| 5,647,607 A | * | 7/1997 | Bolieau .................. 280/728.3 |
| 5,651,562 A | | 7/1997 | Hagen et al. |
| 5,662,375 A | | 9/1997 | Adams et al. |
| 5,681,051 A | * | 10/1997 | Phillion .................. 280/728.3 |
| 5,765,862 A | * | 6/1998 | Bentley .................. 280/728.3 |
| 5,775,859 A | * | 7/1998 | Anscher .................. 411/344 |
| 5,813,693 A | | 9/1998 | Gordon et al. |
| 5,943,741 A | * | 8/1999 | Furutsu .................. 24/16 PB |
| 5,947,509 A | * | 9/1999 | Ricks et al. .................. 280/728.2 |
| 5,979,929 A | * | 11/1999 | Stanger et al. .................. 280/732 |
| 6,041,925 A | * | 3/2000 | Grendol .................. 206/343 |
| 6,145,870 A | * | 11/2000 | Devane et al. .................. 280/728.3 |

FOREIGN PATENT DOCUMENTS

DE 4315853 A1 * 11/1994 .......... B60R/21/20

\* cited by examiner

Primary Examiner—Avraham Lerner
Assistant Examiner—Joselynn Y. Sliteris
(74) Attorney, Agent, or Firm—MacMillan, Sobanski & Todd, LLC

(57) ABSTRACT

A dual stage fastener for securing a vehicle interior trim component to a vehicle body component to cover an air curtain during storage. The fastener includes a pin tethered to a grommet. During deployment of the air curtain, the pin disengages from the grommet and the tether restrains the pin and the associated trim component to reduce the length of travel of the trim component within the passenger compartment of the vehicle.

9 Claims, 2 Drawing Sheets

DUAL STAGE FASTENER

FIELD OF THE INVENTION

The present invention relates to a dual stage fastener for securing a vehicle interior trim component to a vehicle body component to cover a stored air curtain and more particularly to a fastener including a pin and a grommet wherein the pin is tethered to the grommet to secure the trim component to the body component when the air curtain is deployed to limit the travel length of the trim component within the vehicle passenger compartment.

BACKGROUND OF THE INVENTION

Most passenger vehicle are equipped with one or more air bag or air curtain modules located at selected areas of the vehicle passenger compartment, for example, in the steering wheel housing in front of the driver of the vehicle. Air curtains are typically housed in a recess formed in a vehicle body component, such as the steering wheel housing or a fixed structural member of the vehicle. A detachable trim component, such as a cover or panel, covers the opening of the recess to hide the folded air curtain from view. Upon certain vehicle impact conditions, the air curtain is deployed from a folded condition behind the trim component to an unfolded and expanded condition out from the recess to help cushion and immobilize an occupant of the vehicle to reduce injury thereto. Expansion of the air curtain during deployment forces the trim component, such as a cover or panel, to be detached from the vehicle component permitting the air curtain to expand outwardly from the recess.

Various fasteners have been used to secure the trim component to the vehicle component. Air curtain covers and associated trim components used in a vehicle present a unique fastening challenge due to the large forces exerted on such components within a short period of time when the air curtain is deployed. It is desirable to limit the length of travel and direction of travel of the air curtain trim component. Some prior art structures have used a tether fastened to the cover itself as is disclosed in U.S. Patent No. 5,651,562. The direction the air curtain cover is propelled cannot be adequately controlled where the cover is tethered, however.

SUMMARY OF THE INVENTION

The above, as well as other objects of the invention, may be readily achieved by a fastener for fastening a vehicle interior trim component to an associated vehicle component comprising: a grommet adapted to be attached to the vehicle component, the grommet having an aperture formed therein; and a pin tethered to the grommet, the pin adapted to be attached to the trim component and releasably inserted through the aperture formed in the grommet to releasably secure the trim component to an associated vehicle component.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
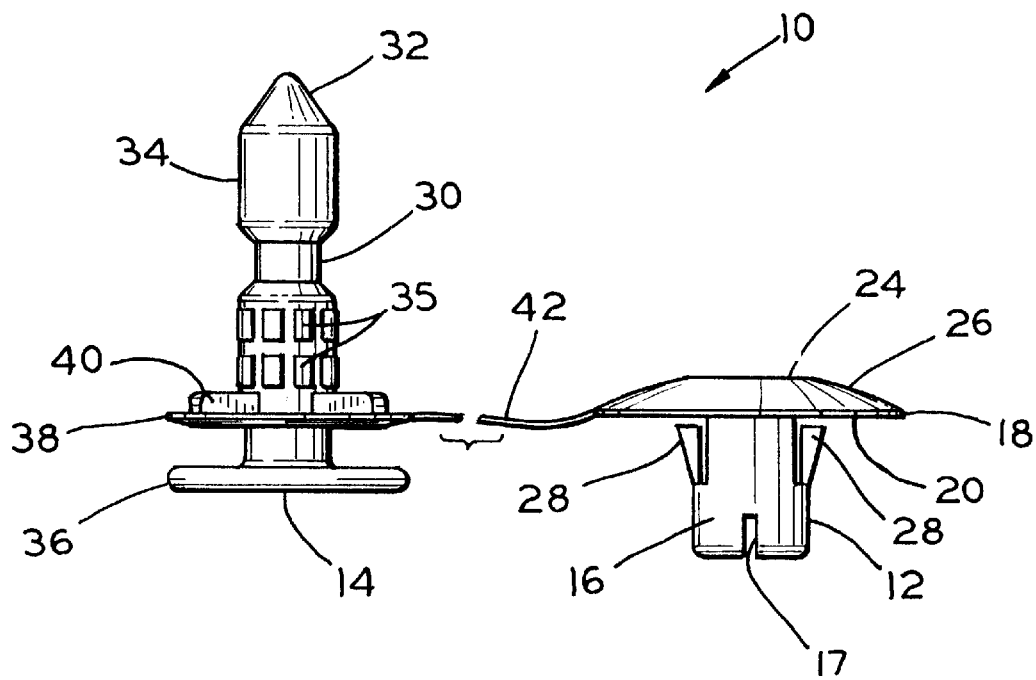
FIG. 1 is an elevational side view of a dual stage fastener with the head of the grommet in section incorporating the features of the invention and shown disassembled.
Figure 2:
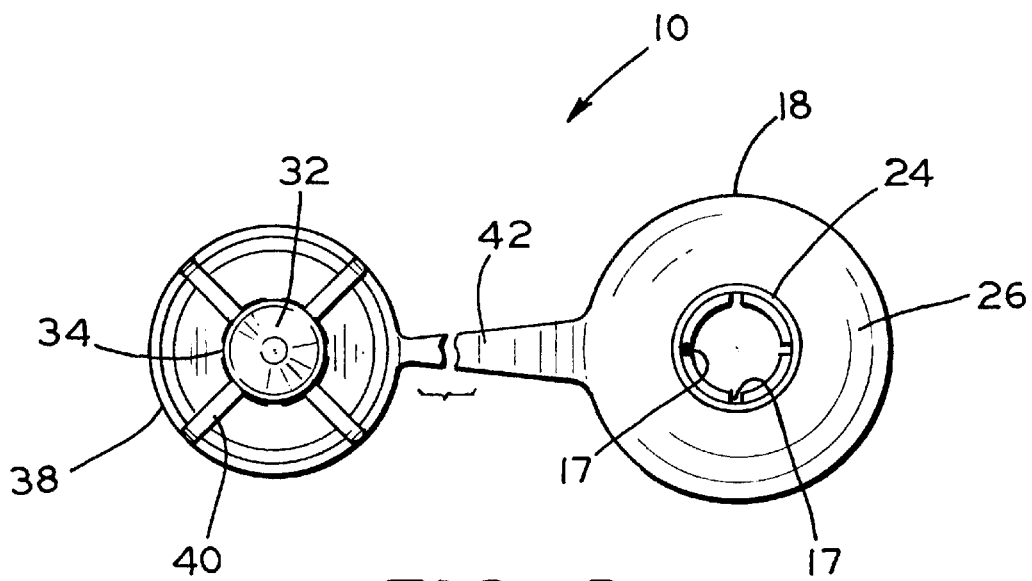
FIG. 2 is a top plan view of the dual stage fastener illustrated in FIG. 1.

Referring now to the drawings, and particularly FIG. 1, there is shown generally at 10 a dual stage fastener incorporating the features of the invention. The dual stage fastener 10 generally includes a hollow grommet 12 and a pin 14 which are connected together by a strap or tether 42.

The grommet 12 includes a hollow cylindrical shaft 16 having a plurality of axially aligned slits 17 formed therein. A substantially radially outwardly extending annular head 18 is disposed at one end of the shaft 16. The head 18 is dish shaped with an outer peripheral edge and two oppositely facing surfaces. The first surface 20 of the head 18 is preferably flat to permit the head 18 be placed against a vehicle component or part 22, as clearly illustrated in FIGS. 3 and 4. The second surface of the head 18 has a centrally disposed flat portion 24 and a beveled portion 26 disposed radially outwardly of the flat portion 24. Resilient detents 28 are disposed to extend radially outward of the outer wall of the shaft 16. The detents 28 are spaced apart from the first surface 20 of the head 18 to permit the vehicle component 22 to be interposed between the first surface 20 and the detents 28.

The pin 14 includes a cylindrical shaft 30 which terminates in a beveled end 32. Adjacent the beveled end 32, the shaft 30 has an enlarged portion 34. A plurality of raised pads 35 are disposed on an axially central portion of the shaft 30. A radially outwardly extending annular head 36 is disposed at the distal end of the pin 14. A second outwardly extending annular flange 38 is disposed in adjacent spaced relation to the annular head 36. Ribs 40 are disposed on the side of the flange 38 opposite the head 36.

A flexible tether 42 joins the flange 38 of the pin 14 with the head 18 of the grommet 12. The grommet 12, the pin 14, and the tether 42 can be made of any suitable material, such as plastic. Preferably, the grommet 12, the pin 14, and the tether 42 are formed as one integral part, for example, by an injection molding process. By forming the fastener into one part, manufacturing and assembly costs are reduced, compared to securing a separate tether to separate fastening structures.

Figure 4:
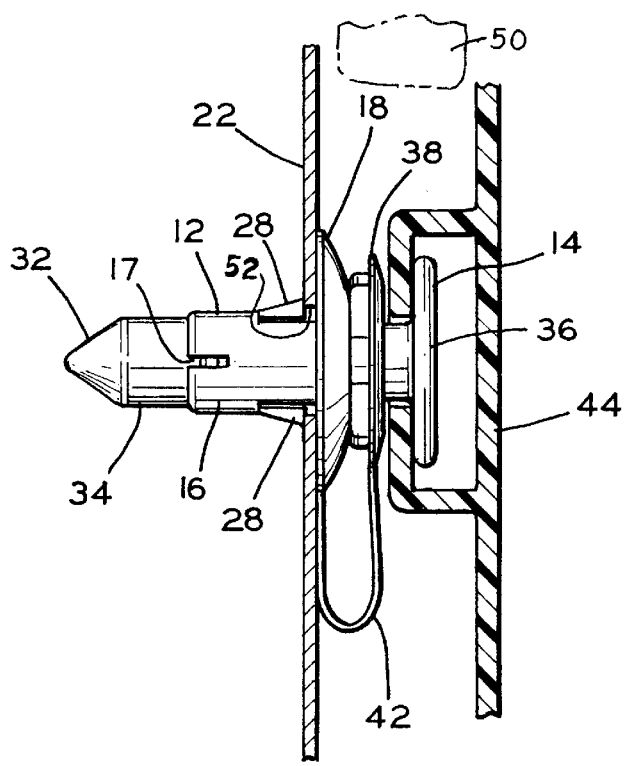
FIG. 4 is an elevational side view of the dual stage fastener illustrated in FIGS. 1 and 2 showing the dual stage fastener assembled and the trim component and the vehicle component attached to the dual stage fastener.
Figure 3:
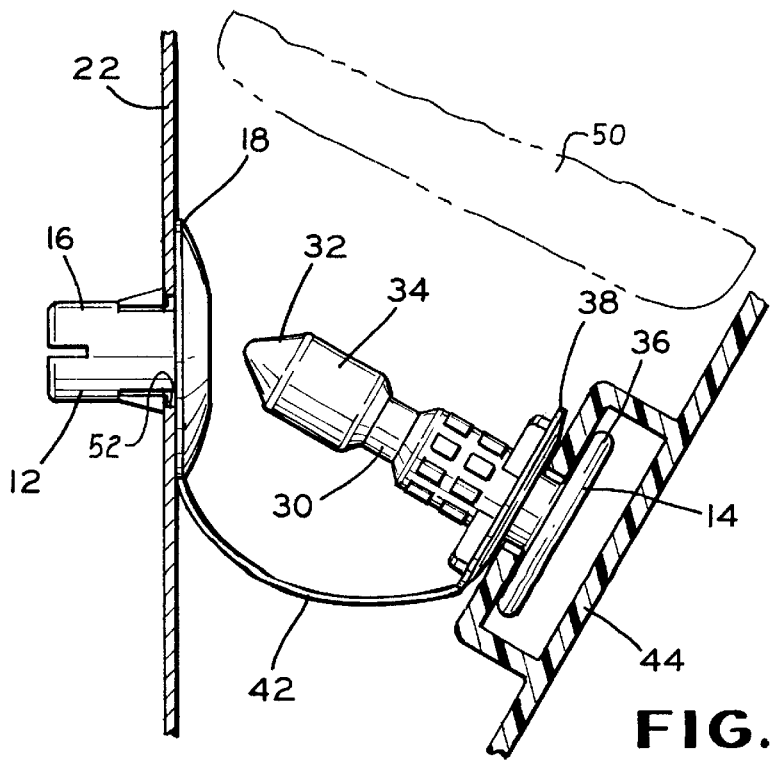
FIG. 3 is an elevational side sectional view of the dual stage fastener illustrated in FIGS. 1 and 2 showing the dual stage fastener unassembled and the trim component and the vehicle component attached to the dual stage fastener.

As illustrated in FIGS. 3 and 4, the dual stage fastener 10 may function to releasably fasten a cover or trim component 44 to the vehicle component 22 to cover an air curtain 50 in a stored and folded position in a vehicle passenger compartment, for example. The trim component 44 and the vehicle component 22 can be any suitable structures for covering and mounting the air curtain 50. In use, the grommet 12 is inserted into an aperture 52 formed in the vehicle component 22. Detents 28 are deflected inwardly during insertion of the grommet 12 and are urged outwardly to their original position once the vehicle component 22 has passed to the space between the detents 28 and the flat portion 24 of the head 18. The detents 28 hold the grommet 12 securely within the aperture of the vehicle component 22.

As the pin 14 is then inserted into the hollow portion of the grommet 12, the enlarged portion 34 of the pin 14 causes the slits 17 of the shaft 16 to separate slightly permitting the walls of the shaft 16 to be expanded. The enlarged portion 34 of the pin 14 is allowed to pass through the shaft 16 of the grommet 12, and the walls of the shaft 16 resiliently and frictionally maintain the pin 14 in place within the grommet 12. The pads 35 cooperate with the walls of the shaft 16 to allow the pin 14 to be releasably held in place. The pin 14 is releasably held in the grommet 12 until deployment of the air curtain. Of course, the pin 14 could be releasably held in the grommet 12 by any suitable manner.

When the air curtain is deployed and expands, the pin 14 is caused to be released from the grommet 12, as shown in FIG. 3. The tether 42, cooperating with the securely held grommet 12, prevents the trim component 44 from becoming a projectile within the vehicle passenger compartment. Thus, the tether 42 limits the amount of travel of the trim component 44 within the vehicle passenger compartment of the vehicle. The direction the trim component 44 when propelled upon deployment of the air curtain can be controlled through strategic placement of the dual stage fasteners 10.

Installation and assembly of the dual stage fastener 10 is simplified over prior art fasteners. The number of steps is reduced for an assembly worker since the dual stage fastener 10 is preferably a single integral piece, requiring only one step to procure the dual stage fastener 10. Two piece fasteners require a worker to procure two pieces, thereby requiring two steps. If desired, the dual stage fastener 10 can be pre-attached to the trim component 44. The grommet 12 can then be inserted into an aperture formed in the vehicle component 22 and the pin 14 inserted into the hollow portion of the grommet 12 to accomplish installation of the trim component 44, thereby providing for simple installation of the trim component 44.

Although the dual stage fastener 10 is shown and described as the grommet 12 being secured to the vehicle component 22 and the pin 14 being secured to the trim component 44, alternatively, the grommet 12 can be installed in the trim component 44 and the pin 14 can be installed in the vehicle component 22 to accomplish the same objective.

It should be understood that the grommet 12 and the pin 14 can have any suitable cooperating shapes and structures, other than the illustrated embodiment, for fastening the trim component 44 to the vehicle component 22.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for a vehicle comprising:
    an inflatable air curtain being deployed through a first opening in a vehicle part;
    a cover securable to the vehicle part to close the first opening in the vehicle part; and
    at least one fastener for releasably attaching said cover to the vehicle part, said fastener including:
        a grommet attached to one of said cover and the vehicle part, said grommet having an aperture formed therein; and
        a pin tethered to said grommet, said pin attached to the other one of said cover and the vehicle part, wherein said pin is releasably inserted through the aperture formed in said grommet to releasably secure said cover to the vehicle part.

2. The apparatus according to claim 1, wherein said pin is tethered to said grommet by a flexible strap.

3. The apparatus according to claim 2, wherein the grommet, the pin, and the strap are integrally formed together as one part.

4. The apparatus according to claim 1, wherein said pin is fixed to said cover.

5. The fastener according to claim 1, wherein said pin has a circumferential outer surface, a first end, and a second end.

6. The fastener according to claim 5, wherein the outer surface of said pin includes an enlarged portion adjacent the first end of said pin.

7. The fastener according to claim 6, wherein said pin includes a radially outwardly extending annular head adjacent the second end of said pin.

8. The fastener according to claim 7, wherein said pin includes a radially outwardly extending annular flange spaced apart from the head of said pin.

9. The fastener according to claim 1, wherein said grommet includes an annular array of spaced apart outwardly extending detents.

* * * * *